H. D. MILLS.
WHEEL.
APPLICATION FILED MAR. 19, 1914.
1,139,209.
Patented May 11, 1915.
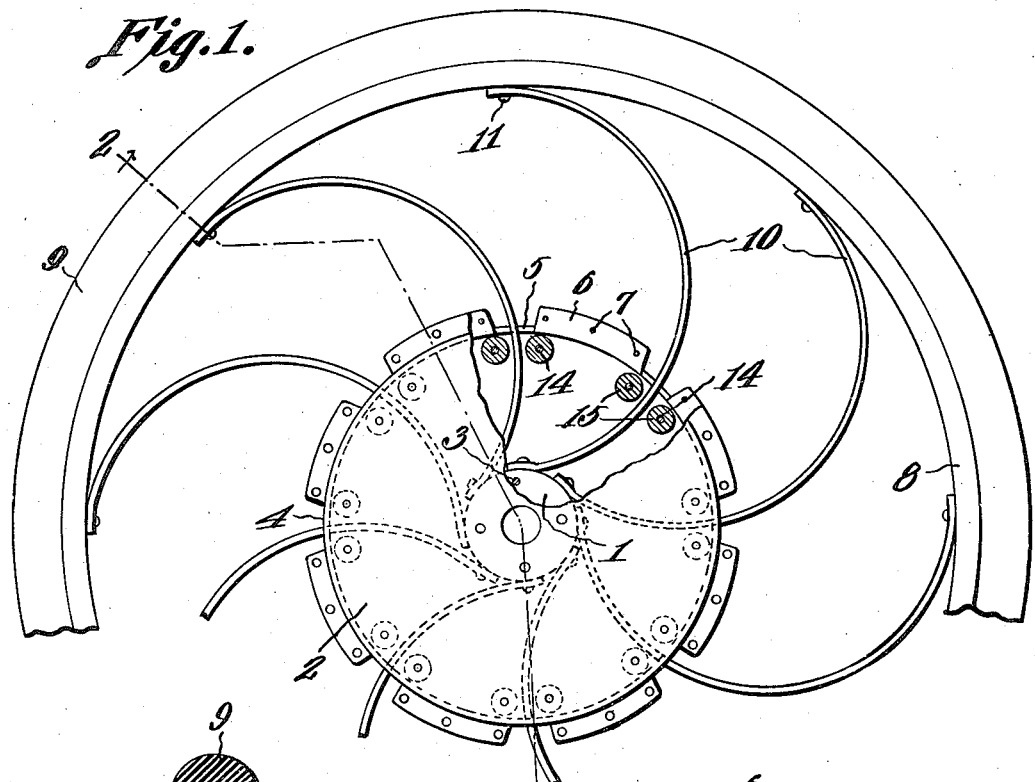
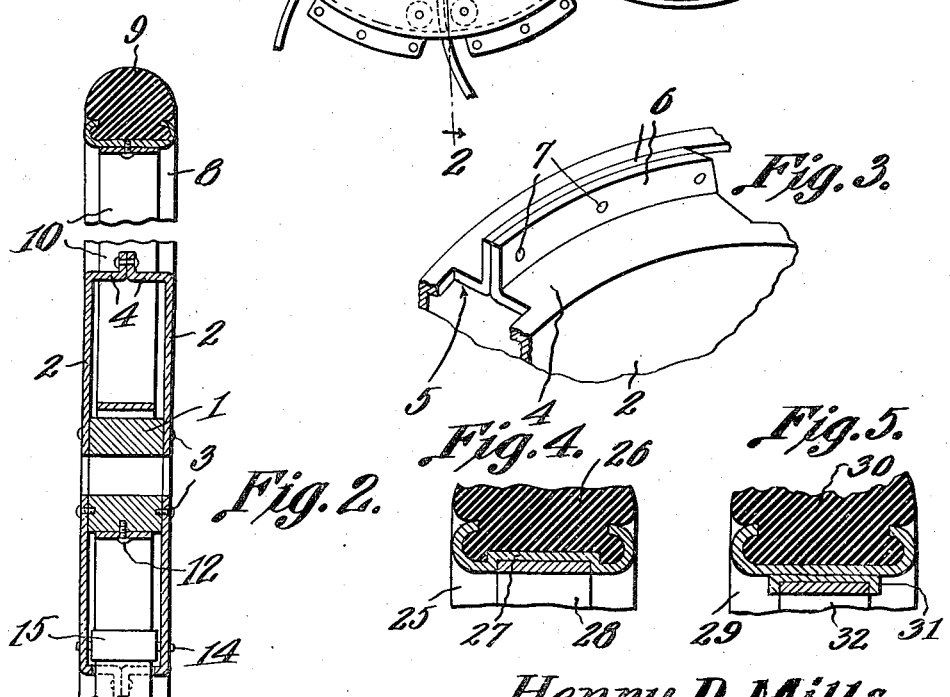
Henry D. Mills,
Inventor
Witnesses
by
Attorneys

UNITED STATES PATENT OFFICE.

HENRY D. MILLS, OF FAR ROCKAWAY, NEW YORK.

WHEEL.

1,139,209.

Specification of Letters Patent.  Patented May 11, 1915.

Application filed March 19, 1914.  Serial No. 825,878.

*To all whom it may concern:*

Be it known that I, HENRY D. MILLS, a citizen of the United States, residing at Far Rockaway, in the county of Queens and State of New York, have invented a new and useful Wheel, of which the following is a specification.

The device forming the subject matter of this application is a resilient wheel, and one object of the present invention is to provide a device of this type in which pneumatic tires and other inflatable elements subject to puncture and damage may be dispensed with.

Another object of the invention is to provide novel means for anti-frictionally supporting the spring spokes intermediate their ends, thereby to prevent an undue straining of the spokes at times.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows in side elevation, a portion of the wheel constructed in accordance with the present invention, parts being broken away; Fig. 2 is a cross section on the line 2—2 of Fig. 1; Fig. 3 is a fragmental perspective illustrating a portion of the hub; Figs. 4 and 5 are transverse sections showing modifications in the means whereby the outer ends of the spokes are secured to the rim.

In carrying out the present invention there is provided a hub which is a composite structure. The hub includes a tubular portion 1, to the ends of which side plates 2 are attached, by means of securing elements 3. The peripheries of the side plates 2 are extended toward the median plane of the wheel to form approaching, marginal flanges 4. In these flanges 4 opposed notches are formed, the notches coöperating to define openings 5. Between the openings 5, the marginal flanges 4 are outwardly extended, as will be understood best from Fig. 3, to form ears 6 which are united by securing elements 7.

The rim 8 may be of any desired form and supports a tire 9 which may be a solid construction or may be otherwise formed.

The invention includes a plurality of arched spring spokes 10, the outer ends of which are attached by means of securing elements 11 to the rim 8. The spring spokes 10 pass inwardly through the openings 5, and the inner ends of the spokes are united by means of securing elements 12 with the tubular body portion 1 of the hub. In the side plates 2 upon each side of each opening 5 shafts 14 are mounted, the same carrying anti-friction elements 15, which may be rollers, the anti-friction elements 15 being disposed in pairs, and the rollers of each pair lying upon opposite sides of one of the spring spokes 10.

When the spring spokes begin to yield, the same will come into contact with the rollers 15 and these rollers 15 will rotate to a slight extent, so that the entire resilient action of the spokes, within the contour of the marginal flanges 4 will not be deadened. However, the rollers 15 will receive a sufficient amount of the strain imposed upon the spokes, so that the same will be reinforced against undue strains.

The ears 6 coöperate to define circumferentially extended reinforced ribs located between the openings 4, these reinforcing ribs serving to strengthen the side plates 2 to withstand the strain imposed thereon when the spokes 10 come into contact with the rollers 15.

In Fig. 4, the rim is denoted by the numeral 25 and the tire is shown at 26. A box, recess or socket shown at 27 may be formed in the rim 25 for receiving the outer end of the spoke 28.

Passing to Fig. 5, the rim is denoted by the numeral 29 and the tire by the numeral 30. In this form of the invention, the box or casing which receives the outer end of the spoke 32 is denoted by the numeral 31 and is attached to the rim 29.

Having thus described the invention, what is claimed is:—

1. In a device of the class described, a hub having a peripheral opening; a rim; an arcuate, transversely resilient spoke connected with the hub and the rim and extended through the opening; and an anti-friction roller extended transversely of the hub and terminally journaled for rotation upon the hub, the roller being located adjacent the opening and being adapted to engage the intermediate portion of the curved face of the spoke when the spoke yields.

2. In a device of the class described, a hub having a peripheral opening; a rim; a spring spoke connected with the hub and the rim and extending through the opening; anti-friction elements journaled upon the hub, upon opposite sides of the opening, and adapted to coöperate with the spoke; the periphery of the hub being equipped with outstanding reinforcing ribs located approximately parallel to the median plane of the wheel and disposed upon opposite sides of the opening.

3. In a device of the class described, a hub comprising a tubular body and side plates secured to the ends of the body, the peripheries of the side plates being provided with approaching marginal flanges having coöperating notches defining openings, the marginal flanges having outwardly extended abutting ears; securing elements connecting the ears; a rim; spring spokes connecting the tubular body and the rim and extended through the openings; shafts connecting the side plates; and spoke-engaging rollers on the shafts and located adjacent the openings.

In testimony that I claim the foregoing as my own, I have hereto affixed my signature in the presence of two witnesses.

HENRY D. MILLS.

Witnesses:
 FRANK MOTT,
 HARRY B. IRVING.